| United States Patent [19] | [11] | 4,211,820 |
|---|---|---|
| Cantaloupe et al. | [45] | Jul. 8, 1980 |

[54] BROWN GLASS-CERAMIC ARTICLES

[75] Inventors: Francis A. Cantaloupe, Horseheads, N.Y.; Robert W. Colegrove, Lawrenceville, Pa.; John E. Megles, Jr.; Hermann L. Rittler, both of Corning, N.Y.

[73] Assignee: Corning Glass Works, Corning, N.Y.

[21] Appl. No.: 8,480

[22] Filed: Feb. 2, 1979

[51] Int. Cl.$^2$ .......................... C03C 3/22; C03C 3/04
[52] U.S. Cl. .................................... 428/410; 106/39.7
[58] Field of Search ............... 106/39.7; 428/410, 428

[56] References Cited
U.S. PATENT DOCUMENTS

| 3,788,865 | 1/1974 | Babcock et al. | 106/39.7 |
| 4,009,042 | 2/1977 | Rittler | 106/39.7 |
| 4,018,612 | 4/1977 | Chyung | 106/39.7 |

*Primary Examiner*—O. R. Vertiz
*Assistant Examiner*—Mark Bell
*Attorney, Agent, or Firm*—Clinton S. Janes, Jr.

[57] ABSTRACT

This invention relates to the production of essentially transparent glass-ceramic sheet useful as surfaces for smoothtop cooking stoves which will display a warm brown coloration sufficiently dark to conceal the heating element when not in use, but permitting visible observation thereof when in operation. The products consist essentially, on an analyzed basis, of 2.5–4.5% $Li_2O$, 1–2% $MgO$, 1–2% $ZnO$, 19.5–21% $Al_2O_3$, 66.5–68% $SiO_2$, 4–5% $TiO_2$, and 0.02–0.2% $V_2O_5$.

1 Claim, No Drawings

BROWN GLASS-CERAMIC ARTICLES

BACKGROUND OF THE INVENTION

Another recent innovation in the design of stoves, especially those fashioned for cooking in the home, has been the development of so-called smoothtop cooking ranges. For the most part, a sheet of glass-ceramic material has comprised the cooking surface of such ranges with electrical heating elements being placed into contact with, or in close proximity to, the underside of the sheet. Cooking utensils are placed upon the glass-ceramic sheet over the heating unit positions.

Glass-ceramics are produced via the crystallization of glass articles. The method of producing such articles comprehends three general steps. First, a glass-forming batch, to which a nucleating agent is frequently added, is melted. Second, the melt is simultaneously cooled to at least below the transformation range thereof and shaped into a glass body of a desired configuration. Third, the glass body is subjected to a predetermined heat treatment to cause the glass to crystallize in situ. Commonly, the heat treatment step is divided into two elements. That is, the glass body is first heated to a temperature within or somewhat above the transformation range to initiate nucleation in the glass. Thereafter, the glass is heated to a higher temperature, frequently a temperature in excess of the softening point of the glass, to effect growth of crystals upon the previously-developed nuclei.

Since the crystallization mechanism involves the essentially simultaneous growth of crystals upon innumerable nuclei dispersed throughout the parent glass body, the microstructure of a glass-ceramic article normally consists of relatively uniformly-sized, fine-grained crystals homogeneously distributed, but randomly oriented, within a residual glassy matrix. Conventionally, the crystal phase will comprise the predominant proportion of the glass-ceramic, i.e., the crystal phase will constitute greater than 50% by volume thereof. Such high crystallinity customarily results in glass-ceramic articles displaying chemical and physical properties quite dissimilar from those of the precursor glass body and more closely akin to those of the crystal phase. Moreover, because the crystal phase commonly forms the majority of a glass-ceramic, the residual glassy matrix will necessarily be small in quantity and quite different in composition from the parent glass, inasmuch as the components making up the crystal phase will have been removed from the glass during the crystallization process. Also, the presence of a residual glassy matrix renders a glass-ceramic free from voids and non-porous.

U.S. Pat. No. 2,920,971, the basic patent in the field of glass-ceramics, contains a detailed description of the mechanism of crystal growth and a study of the several practical considerations inherent in the manufacture of glass-ceramics. Reference is hereby made to that patent for a basic understanding that the crystal phases developed in glass-ceramic articles and the amount of such crystallinity are functions of parent glass composition and the heat treatment parameters to which the parent glass is subjected.

Customarily, the glass-ceramic sheet comprising the smoothtop cooking surface has been opaque and, most generally, has been white in color. The opacity of the material was considered desirable since it concealed the heating units from view. The top or cooking surface of the glass-ceramic sheet has customarily been decorated, at least in those areas above the heating elements, so as to indicate their positions.

This use of an opaque sheet, however, has given rise to a safety hazard in that the surface provides no visible evidence that the heating elements are in operation. Accordingly, persons using the stove may be harmed by inadvertently contacting the smoothtop surface in an area where the operating heating elements are located. Of course, the ranges conventionally have warning lights on the dial or other means for activating the heating units, but accidental burnings are still frequently reported.

Consequently, considerable research has been conducted to develop a glass-ceramic sheet especially suitable for use as smoothtop cooking surfaces which would display an overall pleasant aesthetic appearance and which would conceal the underlying heating units from view when not in operation, but which would provide a visible indication when the heating elements are in use. Laboratory experimentation demonstrated that glass-ceramic sheets could be devised which were sufficiently translucent to mask the heating units when not in operation but would transmit an outline of the elements when functioning. Transparent glass-ceramics were also produced which were sufficiently highly saturated to accomplish the same purpose. Unfortunately, each of those products was subject to a marketing drawback.

First, field testing and consumer surveys indicated that a translucent sheet was not looked upon with much favor by a majority of the persons interviewed. The inherent hazy appearance of the translucent sheet, particularly in white-colored bodies, was considered objectionable.

Second, the transparent materials frequently exhibited mechanical strengths which were unacceptable or, at best, marginal for stove top applications unless the sheets were subjected to a separate and additional strengthening treatment, e.g., chemical strengthening through an ion exchange reaction in a bath of molten salts.

As a result of the above field tests and consumer surveys, a transparent material which would have a warm brown coloration sufficiently dark to conceal the heating element when not in use, but wherein the glow of the unit can be seen in operation, was adjudged to be the most acceptable. For use as stove top surfaces, laboratory and field experience has indicated that the material should exhibit a modulus of rupture of at least 8000 psi and, most preferably, in excess of 14,000 psi.

OBJECTIVE OF THE INVENTION

Accordingly, the primary objective of the instant invention is to provide an essentially transparent glass-ceramic sheet otherwise suitable for use as surfaces for smoothtop cooking ranges which, in thicknesses not exceeding about 0.200" (5 mm), will display a warm brown coloration sufficiently dark to conceal the heating element when not in use, but permitting visible observation thereof when in operation, and which will exhibit a modulus of rupture of at least 8000 psi.

SUMMARY OF THE INVENTION

We have found that the above objective can be achieved through the application of a rigorously-defined heat treatment schedule to glass sheet having a composition within narrowly-delimited ranges. Thus, the precursor glass will have a composition consisting essentially, as analyzed in percent by weight on the oxide basis, of

| | |
|---|---|
| SiO$_2$ | 66.5–68% |
| Al$_2$O$_3$ | 19.5–21 |
| Li$_2$O | 2.5–4.5 |
| ZnO | 1–2 |
| MgO | 1–2 |
| TiO$_2$ | 4–5 |
| V$_2$O$_5$ | 0.02–0.2 |

Very minor amounts of other ingredients may be present but the sum of all such additions will not exceed about 2%. For example, although not absolutely essential, the inclusion of up to about 0.5% F is a very desirable addition for two purposes: first, as a melting aid; and, second, its presence appears to improve the strength of the final product. Up to about 0.6% As$_2$O$_5$ may be added to function in its conventional capacity as a fining agent. Also, up to about 1% ZrO$_2$ may be added to augment TiO$_2$ as a nucleating agent or to replace part of the TiO$_2$.

V$_2$O$_5$ imparts the coloration thereto and also has a positive effect upon the mechanical strength demonstrated by the final glass-ceramic body. The amount of V$_2$O$_5$ is adjusted to yield a visible transmittance through a glass-ceramic sheet having a thickness of about 0.200″ (5 mm) of between about 20–60%, when measured at 800 nm. In general, an amount of V$_2$O$_5$ between about 0.06–0.12% by weight is preferred.

The other constituents are maintained within the cited ranges to insure the development of beta-quartz solid solution crystals with, optionally, beta-spodumene solid solution crystals during the heat treatment process. The final products will exhibit a coefficient of thermal expansion (25°–700° C.) ranging between about $-5-10 \times 10^{-7}/°$ C., a modulus of rupture between about 8000–18,000 psi, and good thermal stability as evidenced by a change of length of no more than about 900 parts per million (PPM) after an exposure of 1000 hours to a temperature of 700° C.

The method for producing glass-ceramic bodies demonstrating the above physical characteristics contemplates five general steps:

(a) a batch of a proper composition is melted;

(b) the melt is simultaneously cooled to a temperature at least below the transformation range of the glass and a glass article of a desired configuration shaped therefrom;

(c) the glass article is heated to a temperature between about 675°–725° C. and held thereat for a period of time adequate to achieve extensive nucleation;

(d) the nucleated glass article is heated to a temperature between about 825°–950° C. and maintained within that range for a period of time sufficient to complete substantial crystal growth; and (e) the crystallized article is cooled to room temperature.

It is well-recognized in the glass-ceramic art that nucleation and crystal growth are dependent upon time and temperature, i.e., the rate of each normally increases with temperature. Consequently, for example, whereas at the cooler end of the crystallization temperature range an exposure of up to 12 hours may be required to yield the desired degree of crystallization, only a few minutes at 950° C. may be sufficient to produce a highly crystalline product. It is also known that the most uniformly-sized crystallization customarily results where extensive nucleation has been generated previously. Furthermore, adequate nucleation can forestall deformation of the glass body as it is heated above the transformation range to induce crystal growth.

(As employed herein, the transformation range is defined as that temperature at which a liquid melt becomes an amorphous solid, that temperature being deemed to lie in the vicinity of the annealing point of the glass.)

With the present glass compositions, the growth of beta-quartz solid solution crystals yields a final product which is transparent and essentially free from haze. At temperatures approaching 900° C. and above, beta-spodumene solid solution crystals will be generated within the interior of the precursor glass body. The development of these crystals effects two advantageous changes in the overall characteristics of the products while, at the same time, giving rise to two less desirable features. On the positive side, the generation of beta-spodumene solid solution crystals appears to improve the mechanical strength and thermal stability of the crystalline articles. Concurrently, however, those crystals effect a small increase in the coefficients of thermal expansion and cause the development of haze in the products. Accordingly, the preferred crystallization temperatures are considered to reside in the 850°–950° C. interval, but with careful control of the time-temperature relationship. To insure adequate nucleation, the precursor glass article will desirably be held within the 675°–725° C. range for about 0.5–4 hours. Likewise, crystallization times of about 0.5–6 hours within the preferred temperature interval have been found very satisfactory.

It will be appreciated that no specific dwell period as such at any one temperature is demanded within the nucleation and crystallization ranges. To insure the desired high crystallinity of very fine-grained crystals, however, it is required that the parent glass article will be retained within the prescribed temperature ranges. The determination of the specific times of retention is well within the ingenuity of the worker in the glass-ceramic art.

Prior Art

The use of inorganic colorants to tint glass is well-known to the art. *Coloured Glasses,* Woldemar A. Weyl, Dawson's of Pall Mall, London, 1959, is a standard text providing a survey of many ions, including vanadium, which have that capability and suggesting mechanisms giving rise to the colors developed.

U.S. Pat. No. 3,788,865 provides a general disclosure for producing colored, transparent glass-ceramic articles utilizing a wide variety of coloring ions, including vanadium, in a broad range of glass-ceramic compositions. However, there is no description of articles having compositions and properties in accord with the present inventive products. Most importantly, there is no recognition of the improvement in mechanical strength which is imparted to the present inventive products through the inclusion of 0.02–0.2% V$_2$O$_5$ in the base composition.

U.S. Pat. No. 4,009,042 describes the production of glass-ceramic articles exhibiting transparency and which also demonstrate high transmission in the infrared portion of the radiation spectrum. The precursor glasses have compositions within the Li$_2$O-Al$_2$O$_3$-SiO$_2$-TiO$_2$ system wherein part of the SiO$_2$ is replaced with AlPO$_4$. Beta-quartz solid solution is the predominant crystal phase in the final product and various colorants, including vanadium, are noted as having utility for developing a colored article. Again, however, there is no discussion of articles having compositions and properties closely akin to the present inventive products, and there is no appreciation of the improvement in mechanical strength arising through the inclusion of 0.02–0.2% V$_2$O$_5$ in the base composition.

U.S. Pat. No. 4,018,612 also discloses the production of glass-ceramic articles exhibiting transparency and high transmission in the infrared portion of radiation spectrum. The parent glasses have compositions within the Li$_2$O-MgO-ZnO-Al$_2$O$_3$-SiO$_2$ field nucleated with a combination of TiO$_2$+ZrO$_2$. Beta-quartz solid solution comprises the predominant crystal phase and a group of colorants, including vanadium, is taught as being useful in producing a colored final product. Yet again, nevertheless, there is no description of articles having compositions and properties fairly duplicating the present inventive products, and there is no disclosure of the enhancement in mechanical strength provided via the presence of 0.02–0.2% V$_2$O$_5$ in the base composition. The inclusion of V$_2$O$_5$ appears to stimulate the formation of beta-spodumene solid solution crystals in the interior of the parent glass, while seemingly inhibiting their development in the surface, and, instead, promotes the growth of beta-quartz solid solution crystals therein. These latter crystals demonstrate greater chemical durability and a generally lower coefficient of thermal expansion.

Description of Preferred Embodiments

Table I recites compositions, analyzed in terms of weight percent on the oxide basis, which are illustrative of the operable parameters of the instant invention. Because it is not known with which cation(s) the fluorine is combined and since it is present in small amounts, it is simply recorded in terms of fluoride.

The actual batch ingredients, other than the fluoride component(s) may be any materials, either the oxides or other compounds, which, when melted together, will be converted into the desired oxide in the proper proportions. The batch ingredients were compounded, ball-milled together to assist in obtaining a homogeneous melt, and deposited into platinum crucibles. The crucibles were then covered, placed into a furnace operating at about 1500°–1650° C., and the batches melted for about 16 hours with stirring. Thereafter, glass canes about 0.25″ in diameter were hand drawn from the melts and the remainder of each melt poured into a steel mold to yield a slab of about 6×6×0.5 inches. The slabs were immediately transferred to an annealer operating at about 600° C.

The loss of fluoride due to volatilization during the melting procedure was relatively low, commonly no more than about 25%. The quantities of Na$_2$O, K$_2$O, and Fe$_2$O$_3$ reported in Table I were present in the batch materials utilized in compounding the glasses.

TABLE I

|  | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| SiO$_2$ | 67.4 | 67.4 | 67.4 | 67.4 | 67.4 | 67.2 | 67.2 | 67.2 | 67.2 | 67.45 | 67.45 | 67.45 | 67.45 | 67.45 | 67.45 | 67.45 | 67.45 | 67.45 | 67.45 |
| Al$_2$O$_3$ | 20.4 | 20.4 | 20.4 | 20.4 | 20.4 | 20.4 | 20.4 | 20.4 | 20.4 | 20.4 | 20.4 | 20.4 | 20.4 | 20.4 | 20.4 | 20.4 | 20.4 | 20.4 | 20.4 |
| Li$_2$O | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 |
| ZnO | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 |
| MgO | 1.6 | 1.6 | 1.6 | 1.6 | 1.6 | 1.6 | 1.6 | 1.6 | 1.6 | 1.6 | 1.6 | 1.6 | 1.6 | 1.6 | 1.6 | 1.6 | 1.6 | 1.6 | 1.6 |
| TiO$_2$ | 4.8 | 4.8 | 4.8 | 4.8 | 4.8 | 4.8 | 4.8 | 4.8 | 4.8 | 4.8 | 4.8 | 4.8 | 4.8 | 4.8 | 4.8 | 4.8 | 4.8 | 4.8 | 4.8 |
| As$_2$O$_3$ | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 |
| Na$_2$O | 0.2 | 0.2 | 0.2 | 0.2 | 0.2 | 0.2 | 0.2 | 0.2 | 0.2 | 0.25 | 0.25 | 0.25 | 0.25 | 0.25 | 0.25 | 0.25 | 0.25 | 0.25 | 0.25 |
| K$_2$O | 0.1 | 0.1 | 0.1 | 0.1 | 0.1 | 0.1 | 0.1 | 0.1 | 0.1 | 0.15 | 0.15 | 0.15 | 0.15 | 0.15 | 0.15 | 0.15 | 0.15 | 0.15 | 0.15 |
| F | — | — | — | — | — | 0.22 | 0.22 | 0.22 | 0.22 | 0.22 | 0.22 | 0.22 | 0.22 | 0.22 | 0.22 | 0.22 | 0.22 | 0.22 | 0.22 |
| Fe$_2$O$_3$ | — | — | — | — | — | — | — | — | — | 0.03 | 0.03 | 0.03 | 0.03 | 0.03 | 0.03 | 0.03 | 0.03 | 0.03 | 0.03 |
| V$_2$O$_5$ | — | 0.07 | 0.085 | 0.1 | 0.15 | — | 0.07 | 0.1 | 0.15 | — | 0.02 | 0.03 | 0.04 | 0.06 | 0.07 | 0.08 | 0.12 | 0.1 | 0.15 |

After annealing the slabs and inspecting them and the drawn canes for glass quality, specimens for test measurements were cut therefrom and those specimens moved to a laboratory furnace and subjected to the heat treatment schedules referred to below. A heating rate of about 200° C./hour from room temperature (~23° C.) to the nucleation temperature was utilized with the laboratory furnace, but more rapid rates can be successfully employed since warpage of the glass samples does not appear to be a serious problem. Thereafter, a heating rate of 50° C./hour to the crystallization temperature was used in the laboratory furnace. Somewhat more rapid rates can be feasible, especially if some sort of former or support is utilized to minimize deformation or distortion of the body until substantial crystallization has taken place. The crystallized bodies were conveniently cooled at furnace rate, i.e., the electric current to the furnace was cut off and the furnace allowed to cool to room temperature with the specimens retained therein. This rate averaged about 2°–3° C./minute. Other cooling rates are obviously operable. The following schedules set forth below in Table II must be deemed as illustrative only, not limitative. It is only necessary that nucleation and crystallization be conducted within the above-prescribed temperature intervals.

Table II also records coefficient of thermal expansion determinations (×10$^{-7}$/° C.) and modulus of rupture measurements (psi) carried out in the conventional manner on surface sand blasted bar and cane samples. Spectral transmittance measurements were conducted spectrophotometrically on polished samples of about 4–6 mm thickness. The thermal stability of the crystallized bodies, i.e., the change in length demonstrated thereby after an exposure of 1000 hours to 700° C. was determined employing a Pratt and Whitney super-micrometer. That equipment has a resolution capability of 1×10$^{-5}$ inches with reproducibility of ±5 PPM (Parts Per Million). A system of temperature compensation is utilized to insure day-to-day instrument calibration accuracy employing known standard sample for comparison. The initial length of all samples, approximately 3″×0.5″×0.2″, was measured and, after the 1000-hour exposure and cool down to room temperature, was re-measured. The comparison of the initial and final lengths gave the change of lengths reported in Table II in PPM.

TABLE II

| Ex. No. | Heat Treatment | % Transmittance | Coef. Exp. | Modulus of Rupture | Thermal Stability |
|---|---|---|---|---|---|
| 1 | 2 hours at 710° C. 2 hours at 850° C. | 81 | 2 | 8000 | 850 PPM |
| 2 | 1 hour at 710° C. 1 hour at 850° C. | 47 | 3 | 9000 | 900 PPM |
| 3 | 2 hours at 710° C. 2 hours at 850° C. | 32 | 4 | — | 850 PPM |
| 4 | 1 hour at 710° C. 1 hour at 850° C. | 43 | 3 | 9000 | 1000 PPM |
| 5 | 2 hours at 710° C. 2 hours at 850° C. | 25 | 3 | 8000 | 850 PPM |
| 6 | 2 hours at 710° C. 2 hours at 850° C. | 82 | 2 | 9000 | 850 PPM |
| 7 | 6 hours at 710° C. 6 hours at 850° C. | 32 | 4 | 8500 | 630 PPM |
| 7 | 1 hour at 710° C. 1 hour at 850° C. | 35 | 3 | 8000 | 850 PPM |
| 8 | 1 hour at 710° C. 1 hour at 850° C. | 26 | 2 | 9000 | 900 PPM |
| 9 | 1 hour at 700° C. 1 hour at 920° C. | — | 10 | 15,000 | 500 PPM |
| 10 | 1 hour at 700° C. 1 hour at 900° C. | 82.5 | 8 | 16,000 | 700 PPM |
| 11 | 1 hour at 700° C. 1 hour at 900° C. | 64.6 | 7 | 15,000 | 700 PPM |
| 12 | 1 hour at 700° C. 1 hour at 900° C. | 57.3 | 6 | 14,000 | 700 PPM |
| 13 | 1 hour at 700° C. 1 hour at 900° C. | 51.5 | 8 | 15,000 | 700 PPM |
| 14 | 1 hour at 700° C. 1 hour at 900° C. | 40.0 | 9 | 16,000 | 700 PPM |
| 15 | 1 hour at 700° C. 1 hour at 900° C. | 35.9 | 7 | 14,000 | 700 PPM |
| 16 | 1 hour at 700° C. 1 hour at 900° C. | 37.2 | 8 | 17,000 | 700 PPM |
| 17 | 1 hour at 700° C. 1 hour at 900° C. | 27.3 | 9 | 16,000 | 700 PPM |
| 18 | 1 hour at 700° C. 1 hour at 950° C. | 30 | 10 | 17,000 | 700 PPM |
| 19 | 1 hour at 700° C. 2 hours at 825° C. | — | −3 | 8000 | — |

An examination of Table II points up several factors. First, the density of color developed is principally dependent upon the quantity of $V_2O_5$ included in the glass but, to a certain extent, the color concentration can be varied by the heat treatment to which the glass is exposed in the crystallization step. Hence, treatments for long periods of time and, particularly, where such treatments are conducted at the upper extreme of the crystallization range, appear to yield somewhat darker hues. This phenomenon resulting from longer treatments is evidenced in the two runs of Example 7 where the longer heat treatments produced bodies of lower transmittance. Second, the thermal stability demonstrated by the crystalline products is enhanced with longer and/or hotter crystallization heat treatments. This, again, can be observed in a study of the two runs of Example 7 and a comparison of Examples 4 and 7, wherein the Example 4 articles crystallized via a one-hour heat treatment exhibited a change of length of about 1000 PPM after an exposure of 1000 hours to 700° C., whereas the Example 7 articles crystallized in a six-hour heat treatment evidenced a change of length of less than 700 PPM after an exposure of 1000 hours to 700° C. The salutary effect upon thermal stability which higher crystallization temperatures can impart is clearly illustrated in Examples 9–18 where a range of 900°–950° C. was employed for crystallization. Third, the temperature of the crystallization treatment also has a marked effect upon the mechanical strength of the final product. Hence, Examples 9–18, crystallized at 900°–950° C., exhibited modulus of rupture values between about 14,000–17,000 psi, as compared with the 8000–9000 psi displayed by Examples 2–8. X-ray diffraction analyses and a study of electron micrographs of the interior portions and surface layers of the crystallized articles have indicated the presence of beta-spodumene solid solution crystals as the predominant phase in the interior portions and beta-quartz solid solution crystals as the predominant phase in the surfaces. As was observed above, beta-quartz solid solution crystals have a generally lower coefficient of thermal expansion than beta-spodumene solid solution crystals. Therefore, their presence gives rise to an integral surface compression layer on the articles which imparts enhanced overall mechanical strength thereto. Fourth, the inclusion of less than about 200 PPM $V_2O_5$ in the precursor composition will not assure a warm brown coloration displaying a transmittance, in 5 mm thickness, of about 20–60%, when measured at 800 nm.

A visual inspection of the crystallized exemplary compositions makes clear the care that must be undertaken during that procedure. Hence, Examples 9–18, crystallized at 900°–950° C., evidenced a very faint haze, when compared with Examples 2–8. Thus, the growth of any substantial concentration of beta-spodumene solid solution crystals, particularly in the surface of the articles, will lead to a translucent or even opaque article. Accordingly, caution must be exercised, expecially at the higher extreme of the crystallization range, to avoid the development of excessive amounts of beta-spodumene solid solution crystals in the surface which will destroy the desired essential transparency of the product. Moreover, the formation of beta-spodumene solid solution crystals in the surface layer at the expense of beta-quartz solid solution crystals reduces the desired strength enhancement.

The final products were highly crystalline, i.e., greater than about 50% by volume crystalline. Electron microscopic examinations have shown the crystals to be extremely fine-grained, substantially all having diameters of less than one micron with a large majority having diameters of less than 0.5 micron.

Example 18, crystallized at temperatures ranging between 900°–950° C., is our preferred product. Depending upon the heat treatment utilized, the articles will demonstrate a modulus of rupture between about 14,000–18,000 psi, a thermal stability of about 400–700 PPM after 1000 hours at 700° C., a coefficient of thermal expansion (25°–700° C.) between $2-10 \times 10^{-7}/°C.$, and a visible transmittance at 800 nm of between 30–40%.

We claim:

1. An essentially transparent glassceramic article having a coefficient of thermal expansion over the temperature interval of 25°–700° C. of about $-5-10 \times 10^{-7}/°C.$, a modulus of rupture of about 8000–18,000 psi, a change of length of no more than about 900 PPM when exposed to a temperate of 700° C. for a period of 1000 hours, and which, in thickness of about 5 mm. will display a warm brown coloration and a transmittance of about 20–60%, when measured at 800 nm, consisting of a surface layer containing beta-quartz solid solution crystals as the predominant crystal phase with, optionally, a minor proportion of beta-spodumene solid solution crystals dispersed within a glassy matrix and an interior portion containing beta-spodumene solid solution crystals as the predominant crystal phase dispersed within a glassy matrix, said crystals constituting more than 50% by volume of said article and having diameters of less than one micron, said glass-ceramic article having an overall composition consisting essentially, an analyzed in weight percent on the oxide basis, of about 2.5–4.5% $Li_2O$, 1–2% MgO, 1–2% ZnO, 19.5–21% $Al_2O_3$, 66.5–68% $SiO_2$, 4–5% $TiO_2$, and 0.02–0.2% $V_2O_5$, the sum of those components constituting at least about 98% of said article.

* * * * *

UNITED STATES PATENT AND TRADEMARK OFFICE
CERTIFICATE OF CORRECTION

PATENT NO. : 4,211,820

DATED : July 8, 1980

INVENTOR(S) : Francis A. Cantaloupe, Robert W. Colegrove, John E. Megles, Jr., Hermann L. Rittler It is certified that error appears in the above-identified patent and that said Letters Patent are hereby corrected as shown below:

Column 6, line 23, after "specimens" insert --suitable--.

Column 8, line 53, change "glassceramic" to --glass-ceramic--.

Column 8, line 58, change "temperate" to --temperature--.

Column 9, line 3, change "an" to --as--.

Signed and Sealed this

Eighteenth Day of November 1980

[SEAL]

Attest:

SIDNEY A. DIAMOND

Attesting Officer

Commissioner of Patents and Trademarks